US007781726B2

(12) United States Patent
Matsui et al.

(10) Patent No.: US 7,781,726 B2
(45) Date of Patent: Aug. 24, 2010

(54) ENCODER INCLUDING A LIGHT DETECTING DEVICE HAVING TWO SIGNAL PROCESSING SECTIONS FOR PIXELS IN A FIRST AND SECOND DIRECTION

(75) Inventors: Yoshinori Matsui, Hamamatsu (JP); Haruyoshi Toyoda, Hamamatsu (JP); Naohisa Mukozaka, Hamamatsu (JP); Yukinobu Sugiyama, Hamamatsu (JP); Seiichiro Mizuno, Shizuoka (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 11/664,497

(22) PCT Filed: Oct. 3, 2005

(86) PCT No.: PCT/JP2005/018301

§ 371 (c)(1),
(2), (4) Date: Sep. 6, 2007

(87) PCT Pub. No.: WO2006/038591

PCT Pub. Date: Apr. 13, 2006

(65) Prior Publication Data

US 2008/0128601 A1 Jun. 5, 2008

(30) Foreign Application Priority Data

Oct. 4, 2004 (JP) ............................. 2004-291828
Oct. 29, 2004 (JP) ............................. 2004-316209

(51) Int. Cl.
*G01D 5/34* (2006.01)
*H01J 40/14* (2006.01)
(52) U.S. Cl. .............................. 250/231.13; 250/214 R

(58) Field of Classification Search ................
250/231.13–231.18, 566, 568–570, 237 R,
250/237 G, 229, 214 R, 208.1, 221; 341/13,
341/14, 11, 12; 356/614–622
See application file for complete search history.

(56) References Cited

U.S. PATENT DOCUMENTS 5,235,181 A * 8/1993 Durana et al. .......... 250/231.18

(Continued)

FOREIGN PATENT DOCUMENTS

JP 8-10145 1/1996

(Continued)

*Primary Examiner*—Que T Le
*Assistant Examiner*—Jennifer Bennett
(74) *Attorney, Agent, or Firm*—Drinker Biddle & Reath LLP

(57) ABSTRACT

An encoder calculates an absolute value of an operating angle of a scale plate. The scale plate includes light relay portions formed along an operational direction α in the scale plate with a pattern of a one-dimensional array of optically transparent portions and optically nontransparent portions. The encoder identifies the light relay portion formed on a light receiving region, based on second light intensity profile data $V_Y(m)$, and by using the patterns of optically transparent and optically nontransparent portions as codes. The position of a light relay portion can be accurately retrieved using reference positions for each light relay portion in the scale plate. The encoder calculates a center-of-gravity position of the identified light relay portion relative to a reference position in the light receiving region, based on first light intensity profile $V_X(n)$, and calculates an operating angle of the scale plate from the center-of-gravity position.

2 Claims, 6 Drawing Sheets

U.S. PATENT DOCUMENTS

| | | | |
|---|---|---|---|
| 5,703,356 A | * 12/1997 | Bidiville et al. | 250/221 |
| 5,825,307 A | * 10/1998 | Titus et al. | 341/13 |
| 2004/0089796 A1 | * 5/2004 | Patzwald et al. | 250/231.1 |

FOREIGN PATENT DOCUMENTS

| | | |
|---|---|---|
| JP | 10-281811 | 10/1998 |
| JP | 2001-208566 | 8/2001 |
| JP | 2001-221659 | 8/2001 |
| JP | 2002-48601 | 2/2002 |

\* cited by examiner

ENCODER INCLUDING A LIGHT DETECTING DEVICE HAVING TWO SIGNAL PROCESSING SECTIONS FOR PIXELS IN A FIRST AND SECOND DIRECTION

TECHNICAL FIELD

The present invention relates to an optical encoder.

BACKGROUND ART

The following encoder is described as a conventional optical encoder in Patent Document 1. Specifically, light is projected toward an optical scale in which a plurality of grating windows consisting of different types of diffraction gratings are arranged at intervals of a predetermined distance, and a two-dimensional image sensor takes an image of a pattern of diffracted light diffracted by a grating window. Then the encoder specifies the grating window on the basis of the taken pattern of diffracted light, and specifies the position of the grating window in the operational direction of the optical scale on the basis of the position of the pattern of diffracted light in the image, thereby detecting an operating distance of the optical scale.

Patent Document 1: Japanese Patent Publication No. 8-10145

DISCLOSURE OF THE INVENTION

Problem to be Solved by the Invention

However, the above-described encoder, while having a high resolution for detection of the operating distance of the optical scale, requires a frame memory because of the use of the two-dimensional image sensor, and thus has a problem that the apparatus becomes complicated.

The present invention has been accomplished in view of the above-described circumstances and an object of the invention is therefore to provide an encoder capable of accurately detecting an absolute value of an operating angle, an operating distance, or the like of a scale plate in a simple configuration.

Means for Solving Problem

In order to achieve the above object, an encoder according to the present invention is an encoder comprising: a scale plate arranged movably in a predetermined operational direction; a plurality of light relay portions which are formed along the operational direction in the scale plate and each of which is comprised of a one-dimensional array of some of light propagation portions and light nonpropagation portions arranged in a direction perpendicular to the operational direction; a light source device for projecting light toward the light relay potions; and a light detecting device which is arranged to receive the light projected by the light source device, through any of the light relay portions, which has a light receiving region comprised of a two-dimensional array of pixels arranged in the operational direction and in the direction perpendicular to the operational direction, and which outputs light intensity profile data indicating a one-dimensional profile of intensity of incident light in each of the operational direction and the direction perpendicular to the operational direction; wherein each of the light relay portions has a pattern of the one-dimensional array of some of the light propagation portions and light nonpropagation portions different from those of the other light relay portions; and wherein reference light propagation portions are formed in the scale plate and on respective first lines passing the corresponding light relay portions along the direction perpendicular to the operational direction.

In this encoder, each of the light relay portions formed along the operational direction of the scale plate in the scale plate has the pattern of the one-dimensional array of some of the light propagation portions and light nonpropagation portions different from those of the other light relay portions. For this reason, when each light relay portion is provided, for example, with information on an absolute value of an operating angle, an operating distance, or the like of the scale plate (operation absolute value), using the patterns of the one-dimensional arrays as codes, it becomes feasible to identify the light relay portion having relayed the light from the light source device to the light detecting device, based on the light intensity profile data in the direction perpendicular to the operational direction, and to find a fundamental operation absolute value from the identified light relay portion. In the identification of the light relay portion, since the reference light propagation portion is formed in the scale plate and on the first line passing the light relay portion along the direction perpendicular to the operational direction, the light relay portion having relayed the light from the light source device to the light detecting device can be accurately identified with respect to the position of the reference light propagation portion. Furthermore, the encoder is able to calculate the position of the identified light relay portion relative to a reference position in the light receiving region, based on the light intensity profile data in the operational direction, to correct for the fundamental operation absolute value from the calculated position, and to find a more detailed operation absolute value. Since the encoder uses the light detecting device which outputs the light intensity profile data indicating the one-dimensional profile of intensity of incident light in each of the operational direction and the direction perpendicular to the operational direction as described above, it is able to accurately detect the absolute value of the operating angle, the operating distance, or the like of the scale plate in the simple configuration.

Preferably, the encoder comprises a processing unit configured to identify the light relay portion having relayed the light from the light source device to the light detecting device, with respect to a position of the reference light propagation portion, based on the light intensity profile data in the direction perpendicular to the operational direction, thereafter to calculate a position of the light relay portion relative to a reference position in the light receiving region, based on the light intensity profile data in the operational direction, and to find an operation absolute value of the scale plate from the position of the light relay portion. When the encoder comprises such a processing unit, it becomes able to readily detect the absolute value of the operating angle, the operating distance, or the like of the scale plate, as described above.

Preferably, the reference light propagation portions are formed on a second line along the operational direction. This configuration simplifies the processing on the occasion of identifying the light relay portion having relayed the light from the light source device to the light detecting device, with respect to the position of the reference light propagation portion.

Preferably, the light detecting device is arranged to receive the light projected from the light source device, through one or two of the light relay portions. This configuration simplifies the processing on the occasion of detecting the absolute value of the operating angle, the operating distance, or the like of the scale plate.

Preferably, the encoder according to the present invention may be constructed in a configuration wherein the light relay potions comprise a plurality of light relay portions formed on a third line along the operational direction and wherein between the light relay portions adjacent to each other, their patterns of the one-dimensional arrays of some of the light propagation portions and light nonpropagation portions are different in one place from each other, or in a configuration wherein the light relay potions comprise a plurality of light relay portions formed in a zigzag fashion alternately on a fourth line and on a fifth line along the operational direction. By adopting these configurations, even in a case where there simultaneously exist, for example, two light relay portions having relayed the light from the light source device to the light detecting device, the encoder becomes able to identify the two light relay portions, based on the light intensity profile data in the direction perpendicular to the operational direction.

Another encoder according to the present invention is an encoder comprising: a scale plate arranged movably in a predetermined operational direction; a plurality of light relay portions which are formed on a line along the operational direction in the scale plate and each of which is comprised of a one-dimensional array of some of light propagation portions and light nonpropagation portions arranged in a direction perpendicular to the operational direction; a light source device for projecting light toward the light relay potions; and a light detecting device which is arranged to receive the light projected by the light source device, through any of the light relay portions, which has a light receiving region comprised of a two-dimensional array of pixels arranged in the operational direction and in the direction perpendicular to the operational direction, and which outputs light intensity profile data indicating a one-dimensional profile of intensity of incident light in each of the operational direction and the direction perpendicular to the operational direction; wherein each of the light relay portions has a pattern of the one-dimensional array of some of the light propagation portions and light nonpropagation portions different from those of the other light relay portions; and wherein between the light relay portions adjacent to each other, their patterns of the one-dimensional arrays of some of the light propagation portions and light nonpropagation portions are different in one place from each other.

In this encoder, each of the light relay portions formed on the line along the operational direction in the scale plate has the pattern of the one-dimensional array of some of the light propagation portions and light nonpropagation portions different from those of the other light relay portions. For this reason, when each light relay portion is provided, for example, with information on an absolute value of an operating angle, an operating distance, or the like of the scale plate (operation absolute value), using the patterns of the one-dimensional arrays as codes, it becomes feasible to identify the light relay portion having relayed the light from the light source device to the light detecting device, based on the light intensity profile data in the direction perpendicular to the operational direction, and to find a fundamental operation absolute value from the identified light relay portion. Furthermore, the encoder is able to calculate the position of the identified light relay portion relative to a reference position in the light receiving region, based on the light intensity profile data in the operational direction, to correct for the fundamental operation absolute value from the calculated position, and to find a more detailed operation absolute value. Since the encoder uses the light detecting device which outputs the light intensity profile data indicating the one-dimensional profile of intensity of incident light in each of the operational direction and the direction perpendicular to the operational direction as described above, it is able to accurately detect the absolute value of the operating angle, the operating distance, or the like of the scale plate in the simple configuration. Even in a case where there simultaneously exist a plurality of light relay portions having relayed the light from the light source device to the light detecting device, the identification of the plurality of light relay portions based on the light intensity profile data in the direction perpendicular to the operational direction is not hindered because between the light relay portions adjacent to each other, their patterns of the one-dimensional arrays of some of the light propagation portions and light nonpropagation portions are different in one place from each other.

Preferably, the encoder comprises a processing unit configured to identify the light relay portion having relayed the light from the light source device to the light detecting device, based on the light intensity profile data in the direction perpendicular to the operational direction, thereafter to calculate a position of the light relay portion relative to a reference position in the light receiving region, based on the light intensity profile data in the operational direction, and to find an operation absolute value of the scale plate from the position of the light relay portion. When the encoder comprises such a processing unit, it becomes able to readily detect the absolute value of the operating angle, the operating distance, or the like of the scale plate, as described above.

Preferably, the light detecting device is arranged to receive the light projected from the light source device, through one or two of the light relay portions. This configuration simplifies the processing on the occasion of detecting the absolute value of the operating angle, the operating distance, or the like of the scale plate.

EFFECT OF THE INVENTION

The encoders according to the present invention are able to accurately detect the absolute value of the operating angle, the operating distance, or the like of the scale plate in the simple configuration.

EXPLANATIONS OF NUMERALS OR LETTERS

1 . . . encoder; 3 . . . scale plate; 4 . . . light relay portions; 5 . . . optically transparent portions (light propagation portions); 6 . . . optically nontransparent portions (light nonpropagation portions); 7 . . . reference light transparent portions (reference light propagation portions); 8 . . . light source device; 9 . . . profile sensor (light detecting device); 11 . . . processing unit; L1 . . . line (third line); L2 . . . lines (first lines); L3 . . . line (second line); L4 . . . line (fourth line); L5 . . . line (fifth line); α . . . operational direction.

BEST MODE FOR CARRYING OUT THE INVENTION

Preferred embodiments of encoders according to the present invention will be described below in detail with reference to the drawings. In each of the drawings identical or equivalent portions will be denoted by the same reference symbols, without redundant description.

First Embodiment

Figure 2:
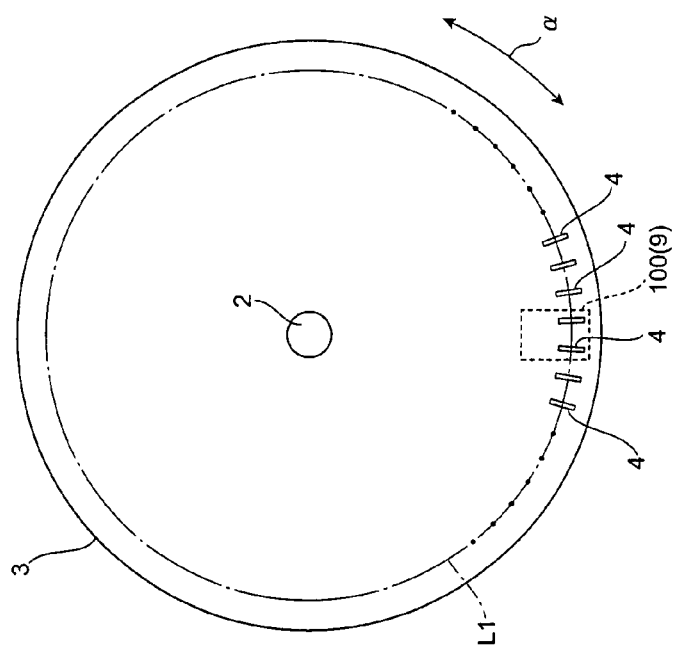
FIG. 2 is a front view of a scale plate in the encoder shown in FIG. 1.
Figure 1:
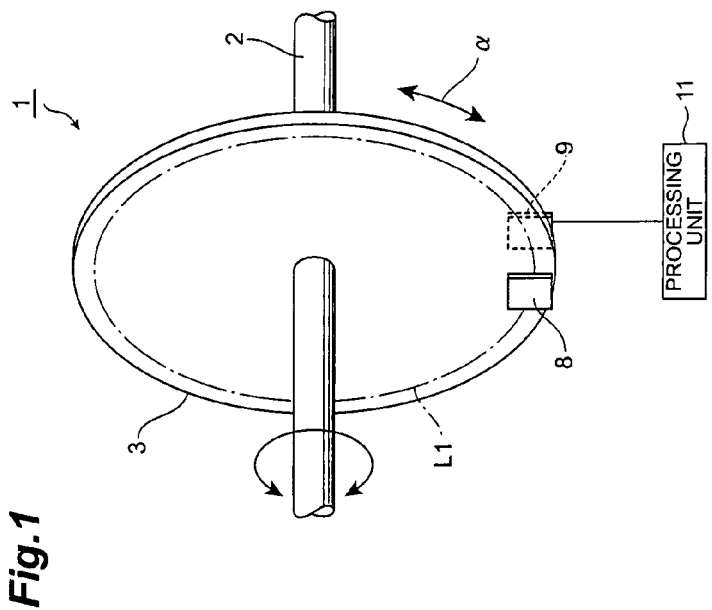
FIG. 1 is a configuration diagram of an encoder according to a first embodiment.

As shown in FIG. 1, the encoder of the first embodiment is a so-called absolute rotary encoder and has a rotary shaft 2 coupled to a measured object (not shown). A scale plate 3 of disk shape is fixed to this rotary shaft 2 and this scale plate 3 rotates with rotation of the rotary shaft 2. Let us define this rotational direction as an operational direction α. As shown in FIG. 2, a plurality of light relay portions 4 are formed on a line (third line) L1 along the operational direction α in the scale plate 3 and at equiangular intervals around the rotary shaft 2.

Figure 3:
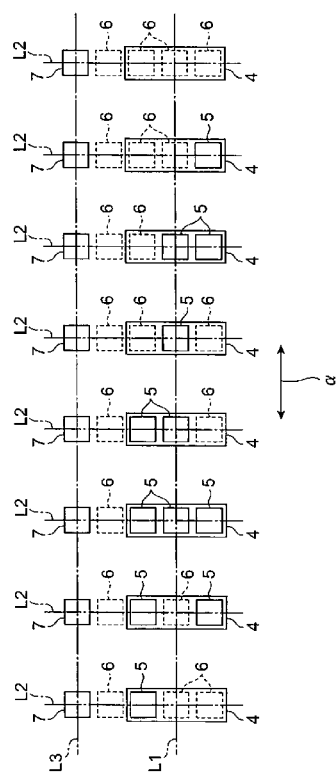
FIG. 3 is a drawing showing light relay portions and reference light transparent portions in the encoder shown in FIG. 1.

The light relay portions 4, as shown in FIG. 3, are comprised of one-dimensional arrays of some of optically transparent portions (light propagation portions) 5, which are formed as optically transparent holes, and optically nontransparent portions (light nonpropagation portions) 6 while they are arranged in a direction perpendicular to the operational direction α. The optically transparent portions 5 transmit light to let the light propagate, while the optically nontransparent portions 6 reflect or absorb light to block the light. Each of the light relay portions 4 has a pattern of the one-dimensional array of some of the optically transparent portions 5 and the optically nontransparent portions 6 different from those of the other light relay portions 4, and between the light relay portions 4, 4 adjacent to each other, their patterns of the one-dimensional arrays of some of the optically transparent portions 5 and the optically nontransparent portions 6 are different in one place from each other.

It is assumed herein that eight light relay portions 4 are arranged at equiangular intervals around the rotary shaft 2 and on the line L1. At this time, a code for 3 bits can be used for making each of the light relay portions 4 having the pattern of the one-dimensional array of some of the optically transparent portions 5 and the optically nontransparent portions 6 different from those of the other light relay portions 4, and the so-called grey code can be used for making the patterns of the one-dimensional arrays of some of the optically transparent portions 5 and the optically nontransparent portions 6 different in one place from each other between the adjacent light relay portions 4, 4. Specifically, let "1" stand for the optically transparent portions 5 and "0" stand for the optically nontransparent portions 6. Then the light relay portions 4 can be expressed by the following codes: "000," "001," "011," "010," "110," "111," "101," and "100" in order from the right in FIG. 3.

Furthermore, in the scale plate 3 reference light transparent portions (reference light propagation portions) 7 are formed as optically transparent holes with one optically nontransparent portion 6 in between the reference light transparent portions 7 and the light relay portions 4, on respective lines (first lines) L2 passing the corresponding light relay portions 4 along the direction perpendicular to the operational direction α and on a line (second line) L3 along the operational direction α.

As shown in FIG. 1, the encoder 1 comprises a light source device 8 consisting of an LED or the like for projecting parallel light toward the light relay portions 4 arranged on the line L1, and a profile sensor (light detecting device) 9 arranged to face the light source device 8 with the scale plate 3 in between. The profile sensor 9 receives light transmitted by the optically transparent portions 5 of the light relay portions 4 among the light projected by the light source device 8 (or receives the light projected by the light source device 8, through any of the light relay portions 4), and outputs light intensity profile data to a processing unit 11.

Figure 4:
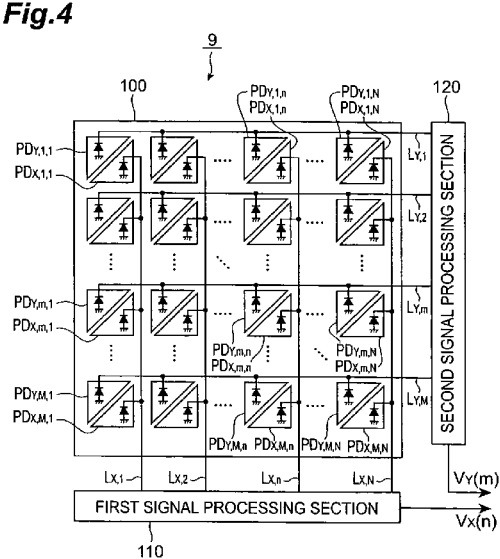
FIG. 4 is a configuration view of a profile sensor in the encoder shown in FIG. 1.

A configuration of the profile sensor 9 will be described below. As shown in FIG. 4, the profile sensor 9 has a light receiving region 100, a first signal processing section 110, and a second signal processing section 120. The light receiving region 100 is comprised of a two-dimensional array consisting of M×N pixels arranged in the operational direction α (the tangential direction to the line L1) and in the direction perpendicular to the operational direction α, and a pixel at a position of the mth row and the nth column is composed of two photodiodes $PD_{X,m,n}$ and $PD_{Y,m,n}$. Each of M and N is an integer of not less than 2, m is an arbitrary integer between 1 and M both inclusive, and n is an arbitrary integer between 1 and N both inclusive. An anode terminal of each photodiode $PD_{X,m,n}$, $PD_{Y,m,n}$ is grounded. Cathode terminals of M photodiodes $PD_{X,1,n}$ to $PD_{X,M,n}$ in the nth column are connected through a common wire $L_{X,n}$ to the first signal processing section 110. Cathode terminals of N photodiodes $PD_{Y,m,1}$ to $PD_{Y,m,N}$ in the mth row are connected through a common wire $L_{Y,m}$ to the second signal processing section 120.

Figure 5:
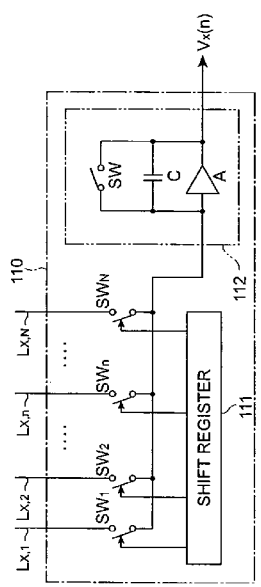
FIG. 5 is a circuit diagram of a first signal processing section included in the profile sensor in the encoder shown in FIG. 1.

The first signal processing section 110, as shown in FIG. 5, has a shift register 111, an integrator circuit 112, and N switches $SW_1$ to $SW_N$. One end of each switch $SW_n$ is connected to a wire $L_{X,n}$ and the other end of each switch $SW_n$ is connected through a common wire to an input terminal of the integrator circuit 112. Each of the switches $SW_n$ is sequentially closed based on a control signal fed from the shift register 111. The integrator circuit 112 has an amplifier A, a capacitor C, and a switch SW. The capacitor C and the switch SW are connected in parallel to each other and disposed between the input and output terminals of the amplifier A. When the switch SW is closed, a charge in the capacitor C is discharged to initialize the voltage output from the integrator circuit 112. When the switch SW is opened and the switch $SW_n$ is closed, the sum of charges generated according to incidence of light to the M respective photodiodes $PD_{X,1,n}$ to $PD_{X,M,n}$ in the nth column connected to the wire $L_{X,n}$ is fed to the integrator circuit 112, the total charge is accumulated in the capacitor C, and the integrator circuit 112 outputs a voltage value $V_X(n)$ according to the accumulated charge amount. The second signal processing section 120 also has a configuration similar to the first signal processing section 110 and operates in much the same fashion.

The profile sensor 9 constructed as described above is able to output first light intensity profile data $V_X(n)$ indicating a one-dimensional profile of intensity of incident light in the operational direction α (the tangential direction to the line L1) in the light receiving region 100, from the first signal processing section 110 and to output second light intensity profile data $V_Y(m)$ indicating a one-dimensional profile of intensity of incident light in the direction perpendicular to the operational direction α, from the second signal processing section 120. The processing unit 11 imports these first light intensity profile data $V_X(n)$ and second light intensity profile data $V_Y(m)$.

Figure 6:
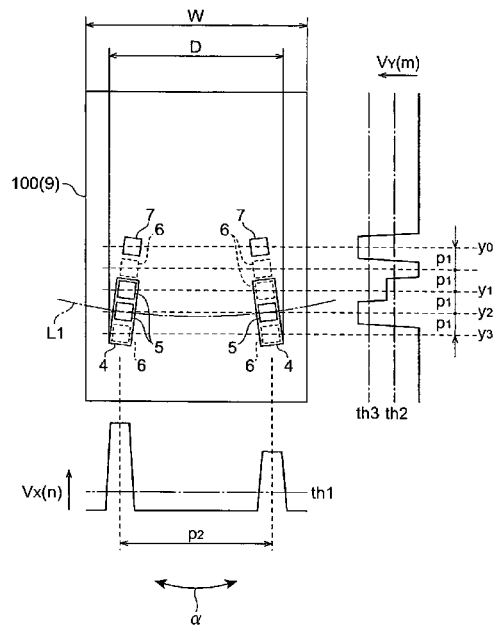
FIG. 6 is a drawing showing a relation between a light receiving region and light relay portions in the encoder shown in FIG. 1.

The profile sensor 9 is arranged to receive the light projected by the light source device 8, through one or two of the light relay portions 4. Namely, the encoder 1 is arranged to satisfy the relational expression of W/2<D<W, where W is a width along the operational direction α of the light receiving region 100 and D is a distance along the operational direction α of the light relay portions 4 adjacent to each other, as shown in FIG. 6. This results in always locating one or two light relay portions 4 on the light receiving region 100.

Next, the processing procedure in the processing unit 11 will be described below with reference to FIG. 6.

The first step is to calculate the number of regions over a predetermined threshold th1 on the basis of the first light intensity profile data $V_X(n)$ in the operational direction α and to determine the number of light relay portions 4 located on the light receiving region 100.

The subsequent step is to calculate a center-of-gravity position of reference light transparent portion 7 on the basis of the second light intensity profile data $V_Y(m)$ in the direction perpendicular to the operational direction α and to define the center-of-gravity position as a reference position $y_0$. On the occasion of calculating the center-of-gravity position of the reference light transparent portion 7, since the reference light transparent portion 7 is formed with one optically nontransparent portion 6 in between the reference light transparent portion 7 and the light relay portion 4, the center-of-gravity position of the reference light transparent portion 7 can be accurately calculated based on the second light intensity profile data $V_Y(m)$.

Then a code of each optically transparent portion 5 or optically nontransparent portion 6 appearing at an interval of distance $p_1$ between centers of gravity in the light relay portion 4 is read with respect to the reference position $y_0$ in accordance with the arithmetic below by j bits (j=1, 2, or 3).

(1) In a case where the number of light relay portions 4 located on the light receiving region 100 is 1, $code(j)=f(V_Y(y_j))=f(V_Y(y_0+(j+1)\times p_1))$ if $(V_Y(y_j)>th2)$ then $f(V_Y(y_j))=1$;

else $f(V_Y(y_j))=0$;

(2) In a case where the number of light relay portions 4 located on the light receiving region 100 is 2, $code(j)=f(V_Y(y_j))=f(V_Y(y_0(j+1)\times p_1))$ if $(V_Y(y_j)>th3)$ then $f(V_Y(y_j))=2$;

if $(V_Y(y_j)>th2)$ and $(V_Y(y_j)<th3)$ then $f(V_Y(y_j))=1$;

if $(V_Y(y_j)<th2)$ then $f(V_Y(y_j))=0$;

where $f(V_Y(y_j))$ is a threshold function. Furthermore, th2 and th3 are thresholds preliminarily determined from the light source device 8, a light receiving sensitivity of the profile sensor 9, and so on; the threshold th2 is defined as a determination standard of brightness in the case where there is one optically transparent portion 5 along the operational direction α, and the threshold th3 is defined as a determination standard of brightness in the case where there are two optically transparent portions 5 along the operational direction α.

According to the above arithmetic, the output value is "120," for example, in the situation shown in FIG. 6. This situation where the output value for the adjacent light relay portions 4 is "120" is only one set in the encoder 1. Namely, codes of the light relay portions 4 located on the light receiving region 100 are "010" and "110." Since the processing unit 11 stores the sequence of codes of the light relay portions 4 ("000," "001," "011," ..., "100" in order from the right in FIG. 3), the code of the right light relay portion 4 in FIG. 6 is uniquely identified as "010" and the code of the left light relay portion 4 is also uniquely identified as "110."

Subsequently, calculation of an operating angle of the scale plate 3 is carried out as follows. First, a center-of-gravity position pos of a region or regions over a threshold th1 is calculated according to the following operation, based on the first light intensity profile data $V_X(n)$ in the operational direction α. The center position of the light receiving region 100 in the operational direction α is defined as an origin (reference position) for the center-of-gravity position pos.

pos=first moment/zeroth moment first moment=$\Sigma(V_X(n)\times n)$ (for each region where $V_X(n)>th1$ continuously holds)

zeroth moment=$\Sigma(V_X(n))$ (for each region where $V_X(n)>th1$ continuously holds)

Then the operating angle θ of the scale plate 3 is calculated according to the following arithmetic from the center-of-gravity position pos calculated by the above operation. The degree 0 is defined as a state in which the center-of-gravity position of the light relay portion 4 with the code "000" agrees with the center position of the light receiving region 100 in the operational direction α.

θ=(code order+pos/$p_2$)×(360/code number)

where $p_2$ is the distance between the centers of gravity of the adjacent light relay portions 4, 4. The code order is defined as follows: "0" for "000"; "1" for "001"; "2" for "011"; ...; "7" for "100"; in order from the right in FIG. 3.

As a specific example, when it is assumed in the case shown in FIG. 6 that the center-of-gravity position of the light relay portion 4 of the code "010" is defined as pos=+150 (pixels), that the center-of-gravity position of the light relay portion 4 of the code "110" is defined as pos=−250 (pixels), and that the distance between the centers of gravity of the adjacent light relay portions 4, 4 is $p_2$=400 (pixels), the operating angle θ of the scale plate 3 is calculated as follows, based on the center-of-gravity position pos of the light relay portion 4 of the code "010."

θ=(3+150/400)×(360/8)=152°

On the other hand, the operating angle θ of the scale plate 3 is calculated as follows, based on the center-of-gravity position pos of the light relay portion 4 of the code "110."

θ=(4+(−250)/400)×(360/8)=152°

As described above, the operating angle θ of the scale plate 3 can be calculated based on either of the center-of-gravity positions of the light relay portions 4 in the case where the two light relay portions 4 are located on the light receiving region 100.

In the encoder 1 of the first embodiment, as described above, each of the light relay portions 4 formed along the operational direction a in the scale plate 3 has the pattern of the one-directional array of some of optically transparent portions 5 and optically nontransparent portions 6 different from those of the other light relay portions 4. This allows the processing unit 11 to identify the light relay portion 4 located on the light receiving region 100, based on the second light intensity profile data $V_Y(m)$ in the direction perpendicular to the operational direction α, using the patterns of the one-dimensional arrays as codes. In the identification of the light relay portion 4, even if the scale plate 3 is eccentric from the rotary shaft 2, the light relay portion 4 located on the light receiving region 100 can accurately be identified with respect to the position of the reference light transparent portion 7 formed for each light relay portion 4 in the scale plate 3. Furthermore, the processing unit is able to calculate the center-of-gravity position of the identified light relay portion 4 relative to the reference position in the light receiving region 100, based on the first light intensity profile data $V_X(n)$ in the operational direction α, and to calculate the detailed operating angle of the scale plate 3 from the center-of-gravity position. As described above, the use of the profile sensor 9 eliminates the need for the frame memory or the like required in the use of the two-dimensional image sensor and enables accurate detection of the operating angle of the scale plate 3 in the simple configuration. In addition, the use of the profile sensor 9 makes it feasible to remarkably decrease the processing time when compared with the case using the two-dimensional image sensor, on the assumption that the number of pixels is the same.

In the encoder 1 of the first embodiment, each reference light transparent portion 7 is placed on the line L3 along the operational direction α. This simplifies the processing on the occasion of identifying the light relay portion 4 located on the light receiving region 100, with respect to the position of the reference light transparent portion 7.

In the encoder 1 of the first embodiment, each of the light relay portions 4 formed on the line L1 along the operational direction α in the scale plate 3 has the pattern of the one-directional array of some of optically transparent portions 5 and optically nontransparent portions 6 different from those of the other light relay portions 4. This allows the processing unit 11 to identify the light relay portion 4 located on the light receiving region 100, based on the second light intensity profile data $V_Y(m)$ in the direction perpendicular to the operational direction α, using the patterns of the one-dimensional arrays as codes. Furthermore, the processing unit is able to calculate the center-of-gravity position of the identified light relay portion 4 relative to the reference position in the light receiving region 100, based on the first light intensity profile data $V_X(n)$ in the operational direction α, and to calculate the detailed operating angle of the scale plate 3 from the center-of-gravity position. As described above, the use of the profile sensor 9 eliminates the need for the frame memory or the like required in the use of the two-dimensional image sensor and enables accurate detection of the operating angle of the scale plate 3 in the simple configuration. In addition, the use of the profile sensor 9 makes it feasible to remarkably decrease the processing time when compared with the case using the two-dimensional image sensor, on the assumption that the number of pixels is the same.

Even in the case where two light relay portions 4 are simultaneously located on the light receiving region 100 as shown in FIG. 6, the patterns of the one-dimensional arrays of some of optically transparent portions 5 and optically nontransparent portions 6 are different in one place from each other between the adjacent light relay portions 4, 4; therefore, there is no hindrance in the identification of the two light relay portions 4 based on the second light intensity profile data $V_Y(m)$ in the direction perpendicular to the operational direction α.

Furthermore, in the encoder 1 of the first embodiment, the profile sensor 9 is arranged to receive the light projected by the light source device 8, through one or two light relay portions 4. This simplifies the processing on the occasion of calculating the operating angle of the scale plate 3.

Second Embodiment

Figure 7:
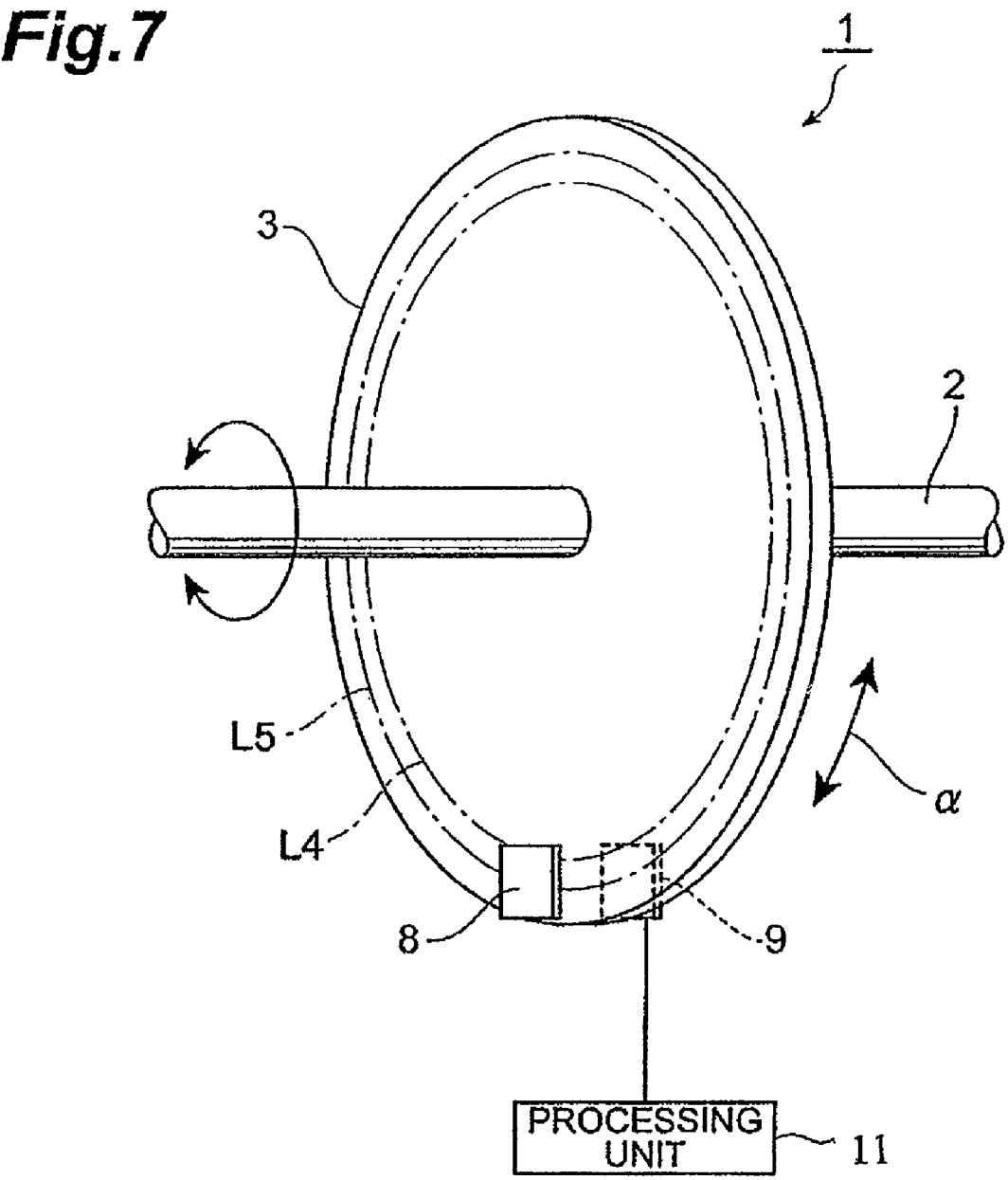
FIG. 7 is a configuration diagram of an encoder according to a second embodiment.
Figure 8:
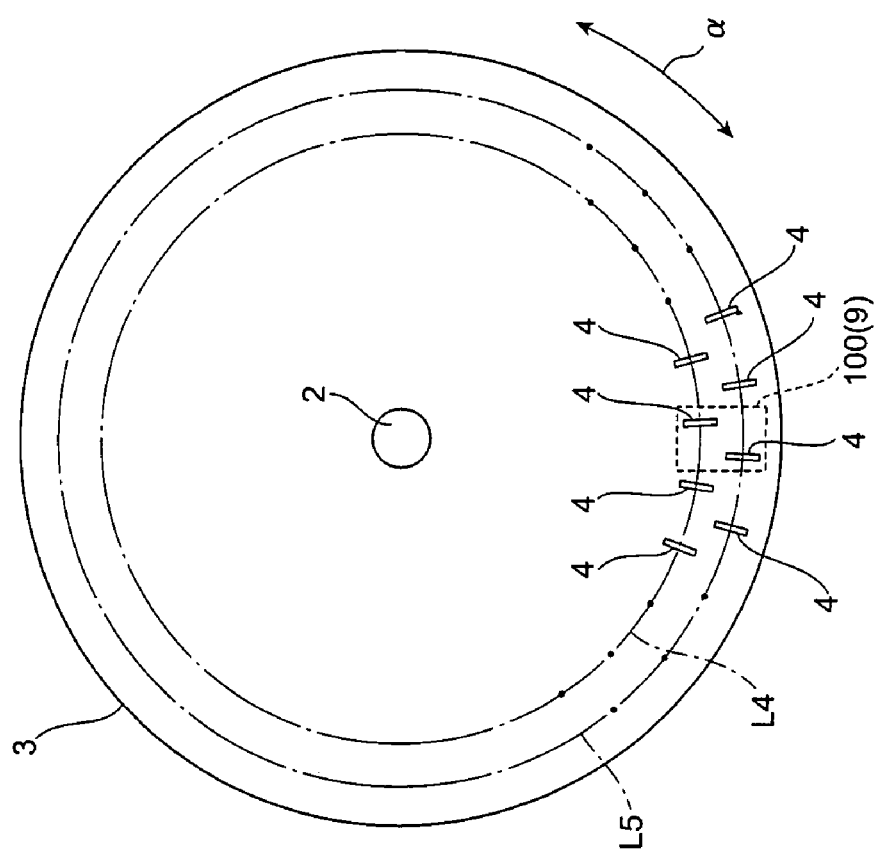
FIG. 8 is a front view of a scale plate in the encoder shown in FIG. 7.

As shown in FIGS. 7 and 8, the encoder 1 of the second embodiment is different mainly in the arrangement of the light relay portions 4 in the scale plate 3 from the encoder 1 of the first embodiment.

Specifically, concentrically circular line (fourth line) L4 and line (fifth line) L5 are set along the operational direction α and a plurality of light relay portions 4 are formed in a zigzag fashion alternately on these lines L4 and L5. More particularly, the light relay portions 4 are arranged at equiangular intervals around the rotary shaft 2 on each of the lines L4 and L5, and each of the light relay portions 4 arranged on the line L5 is located midway between the adjacent light relay portions 4, 4 arranged on the line L4.

Figure 9:
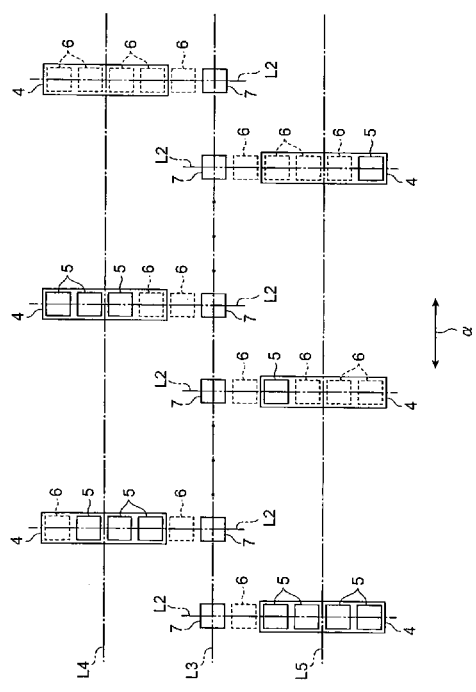
FIG. 9 is a drawing showing light relay portions and reference light transparent portions in the encoder shown in FIG. 7.

The light relay portions 4, as shown in FIG. 9, are comprised of one-dimensional arrays of some of optically transparent portions (light propagation portions) 5 and optically nontransparent portions (light nonpropagation portions) 6 arranged in the direction perpendicular to the operational direction α. Each of the light relay portions 4 has a pattern of the one-dimensional array of some of optically transparent portions 5 and optically nontransparent portions 6 different from those of the others.

It is assumed herein that sixteen light relay portions 4 are arranged at equiangular intervals around the rotary shaft 2 and in a zigzag fashion alternately on the line L4 and on the line L5. At this time, 4-bit codes with "1" for the optically transparent portions 5 and "0" for the optically nontransparent portions 6 can be used in order to achieve the mutually different patterns of the one-dimensional arrays of some of optically transparent portions 5 and optically nontransparent portions 6 for the respective light relay portions 4.

Furthermore, reference light transparent portions (reference light propagation portions) 7 are formed with one optically nontransparent portion 6 in between them and the light relay portions 4, on respective lines (first lines) L2 passing the corresponding light relay portions 4 along the direction perpendicular to the operational direction α and on a line (second line) L3 passing between the lines L4 and L5 along the operational direction α.

Figure 10:
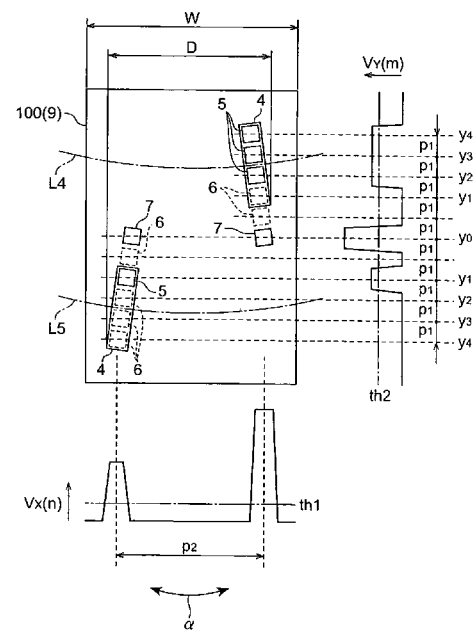
FIG. 10 is a drawing showing a relation between a light receiving region and light relay portions in the encoder shown in FIG. 7.

In the encoder 1 of the second embodiment, the profile sensor (light detecting device) 9 is also arranged to receive the light projected by the light source device 8, through one or two light relay portions 4. Namely, the encoder 1 is arranged to satisfy the relational expression of W/2<D<W, where W is a width along the operational direction α of the light receiving region 100 and D is a distance along the operational direction α of the light relay portions 4 adjacent to each other alternately on the lines L4 and L5, as shown in FIG. 10. This results in always locating one or two light relay portions 4 on the light receiving region 100.

Next, the processing procedure in the processing unit 11 will be described below with reference to FIG. 10.

The first step is to calculate the number of regions over a predetermined threshold th1 on the basis of the first light intensity profile data $V_X(n)$ in the operational direction α and to determine the number of light relay portions 4 located on the light receiving region 100.

The subsequent step is to calculate a center-of-gravity position of reference light transparent portion 7 on the basis of the second light intensity profile data $V_Y(m)$ in the direction perpendicular to the operational direction α and to define the center-of-gravity position as a reference position $y_0$.

Then a code of each optically transparent portion 5 or optically nontransparent portion 6 appearing at an interval of distance $p_1$ between centers of gravity in the light relay portion 4 is read with respect to the reference position $y_0$ in accordance with the arithmetic below by j bits (j=1, 2, 3, or 4).

For the light relay portions 4 on the line L4:

code(j)=f($V_Y(y_j)$)=f($V_Y(y_0−(j+1)×p_1)$)

if ($V_Y(y_j)$>th2) then f($V_Y(y_j)$)=1;

else f($V_Y(y_j)$)=0;

For the light relay portions 4 on the line L5:

code(j)=f($V_Y(y_j)$)=f($V_Y(y_0(j+1)×p_1)$)

if ($V_Y(y_j)$>th2) then f($V_Y(y_j)$)=1;

else f($V_Y(y_j)$)=0.

According to the above arithmetic, the output value in the case shown in FIG. 10 is "0111" for the light relay portion 4 on the line L4 and "1000" for the light relay portion 4 on the line L5. Therefore, the code of the right light relay portion 4 in FIG. 10 is uniquely identified as "0111" and the code of the left light relay portion 4 as "1000."

In the encoder 1 of the second embodiment, as described above, even in the case where two light relay portions 4 are simultaneously located on the light receiving region 100 of the profile sensor 9, the two light relay portions 4 exist on the respective lines L4 and L5, and thus there is no hindrance in the identification of the two light relay portions 4 based on the second light intensity profile data $V_Y(m)$ in the direction perpendicular to the operational direction α.

Thereafter, the calculation of the operating angle of the scale plate 3 is carried out in the same manner as in the case of the encoder 1 of the first embodiment.

In the encoder 1 of the second embodiment, as described above, each of the light relay portions 4 formed along the operational direction a in the scale plate 3 has the pattern of the one-directional array of some of optically transparent portions 5 and optically nontransparent portions 6 different from those of the other light relay portions 4. This allows the processing unit 11 to identify the light relay portion 4 located on the light receiving region 100, based on the second light intensity profile data $V_Y(m)$ in the direction perpendicular to the operational direction α, using the patterns of the one-dimensional arrays as codes. In the identification of the light relay portion 4, even if the scale plate 3 is eccentric from the rotary shaft 2, the light relay portion 4 located on the light receiving region 100 can accurately be identified with respect to the position of the reference light transparent portion 7 formed for each light relay portion 4 in the scale plate 3. Furthermore, the processing unit is able to calculate the center-of-gravity position of the identified light relay portion 4 relative to the reference position in the light receiving region 100, based on the first light intensity profile data $V_X(n)$ in the operational direction α, and to calculate the detailed operating angle of the scale plate 3 from the center-of-gravity position. As described above, the use of the profile sensor 9 eliminates the need for the frame memory or the like required in the use of the two-dimensional image sensor and enables accurate detection of the operating angle of the scale plate 3 in the simple configuration. In addition, the use of the profile sensor 9 makes it feasible to remarkably decrease the processing time when compared with the case using the two-dimensional image sensor, on the assumption that the number of pixels is the same.

It is noted that the present invention is not limited to the first and second embodiments described above.

For example, the encoders 1 of the respective embodiments described above were the rotary encoders wherein the scale plate 3 was subjected to the rotating operation, wherein the rotating direction thereof was defined as the operational direction α of the scale plate 3, and wherein a plurality of light relay portions 4 were formed in the scale plate 3; however, encoders according to the present invention may be linear encoders wherein the scale plate is subjected to a linear motion, wherein the linear direction thereof is defined as an operating direction of the scale plate, and wherein a plurality of light relay portions are formed in the scale plate.

The encoders of the respective embodiments described above were the propagation type encoders wherein the profile sensor 9 was arranged to receive the light transmitted by the optically transparent portion(s) 5 of the light relay portion(s) 4 among the light projected by the light source device 8; however, encoders according to the present invention may be reflection type encoders wherein the profile sensor is arranged to receive light diffracted, scattered, or the like by the light propagation portion(s) of the light relay portion(s) among the light projected by the light source device. Namely, an encoder according to the present invention may be any encoder wherein the profile sensor is arranged to receive the light projected by the light source device, through any of the light relay portions.

In the encode 1 of the first embodiment, where the number of light relay portions 4 located on the light receiving region 100 is 2, identification of the two light relay portions 4 may be carried out as follows. The first step is to acquire output values of codes of the two light relay portions 4 on the basis of the second light intensity profile data $V_Y(m)$ in the direction perpendicular to the operational direction α, as in the above embodiment. The subsequent step is to set a plurality of thresholds (th1×1, th1×2, th1×3, and th1×4) for the first light intensity data $V_X(n)$ in the operational direction α and to perform a threshold process with the plurality of thresholds, thereby determining the number of optically transparent portions 5 and reference light transparent portion 7 of each light relay portion 4. As knowing the output values of the codes of the two light relay portions 4 and the number of optically transparent portions 5 and reference light transparent portion 7 of each light relay portion 4 for the two light relay portions 4 simultaneously located on the light receiving region 100 as described above, one can identify the two light relay portions 4.

As a specific example, in the case shown in FIG. 6, the output value of the code of the two light relay portions 4 based on the second light intensity profile data $V_Y(m)$ is "120." The number of optically transparent portions 5 and reference light transparent portion 7 of the right light relay portion 4 in FIG. 6 is 2, and the number of optically transparent portions 5 and reference light transparent portion 7 of the left light relay portion 4 is 3. There is only one set in the encoder 1 to satisfy the condition that the output value of adjacent light relay portions 4, 4 is "120," the number of optically transparent portions 5 and reference light transparent portion 7 of the right light relay portion 4 is 2, and the number of optically transparent portions 5 and reference light transparent portion 7 of the left light relay portion 4 is 3. Therefore, the code of the right light relay portion 4 in FIG. 6 can be uniquely identified as "010" and the code of the left light relay portion 4 as "110."

Furthermore, in the encoder 1 of the first embodiment, where the number of light relay portions 4 located on the light receiving region 100 is 2, the two light relay portions 4 can also be identified as follows. First, the output value of the code of the two light relay portions 4 is acquired based on the second light intensity profile data $V_y(m)$ in the direction perpendicular to the operational direction α, as in the above embodiment. Subsequently, a comparison is made between the second light intensity profile data $V_y(m)$ and the threshold th2 and the existence of an opening can be found if the condition of $V_y(m)>th2$ is met. Since the difference from the adjacent code is always one place, it can be determined that the position of different code (1) is one with minimum $V_y(m)$ out of blocks satisfying the condition of $V_y(m)>th2$.

INDUSTRIAL APPLICABILITY

The encoders according to the present invention are able to accurately detect the absolute value of the operating angle, the operating distance, or the like of the scale plate in the simple configuration.

The invention claimed is:

1. An encoder comprising:
   a scale plate arranged movably in a predetermined operational direction;
   a plurality of light relay portions which are formed along the operational direction in the scale plate and each of which is comprised of a one-dimensional array of some of light propagation portions and light nonpropagation portions arranged in a direction perpendicular to the operational direction;
   a light source device for projecting light toward the light relay portions; and
   a light detecting device which is arranged to receive the light projected by the light source device, through one or two of the light relay portions, which has a light receiving region comprised of a two-dimensional array of pixels arranged in the operational direction and in the direction perpendicular to the operational direction, and which outputs light intensity profile data indicating a one-dimensional profile of intensity of incident light in each of the operational direction and the direction perpendicular to the operational direction; and
   a processing unit for finding an operation absolute value of the scale plate;
   wherein each of the light relay portions has a pattern of the one-dimensional array of some of the light propagation portions and light nonpropagation portions different from those of the other light relay portions;
   wherein reference light propagation portions are formed in the scale plate and on respective first lines passing the corresponding light relay portions along the direction perpendicular to the operational direction;
   wherein the processing unit is configured to identify the light relay portion having relayed the light from the light source device to the light detecting device, with respect to a position of the reference light propagation portion, based on the light intensity profile data in the direction perpendicular to the operational direction, thereafter to calculate a position of the light relay portion relative to a reference position in the light receiving region, based on the light intensity profile data in the operational direction, and to find the operation absolute value of the scale plate from the position of the light relay portion;
   wherein the light relay portions comprise a plurality of light relay portions formed on a second line along the operational direction, and wherein between the light relay portions adjacent to each other, their patterns of the one-dimensional arrays of some of the light propagation portions and light nonpropagation portions are different in one place from each other;
   wherein the light detecting device is a profile sensor, and the profile sensor has the light receiving region, a first signal processing section, and a second signal processing section;
   wherein the light receiving region comprises a two-dimensional array consisting of M×N pixels arranged in the operational direction and in the direction perpendicular to the operational direction, a pixel at a position of the mth row and the nth column is composed of two photodiodes, each of M and N is an integer of not less than 2, m is an arbitrary integer between 1 and M both inclusive, and n is an arbitrary integer between 1 and N both inclusive;
   wherein an anode terminal of each photodiode is grounded, cathode terminals of M photodiodes in the nth column are connected through a common wire to the first signal processing section, and cathode terminals of N photodiodes in the mth row are connected through a common wire to the second signal processing section;
   wherein the processing unit calculates the number of regions over a first predetermined threshold on the basis of the light intensity profile data in the operational direction, and determines the number of light relay portions located on the light receiving region;
   wherein the processing unit identifies the light relay portion having relayed the light from the light source device to the light detecting device by using a second predetermined threshold and a third predetermined threshold, with respect to a position of the reference light propagation portion, based on the light intensity profile data in the direction perpendicular to the operational direction, the second predetermined threshold is defined as a determination standard of brightness in a case where there is one light propagation portion along the operational direction, and the third predetermined threshold is defined as a determination standard of brightness in the case where there are two light propagation portions along the operational direction; and
   wherein the processing unit calculates a position of the light relay portion relative to a reference position in the light receiving region by calculating a center-of-gravity position of a region or regions over the first predetermined threshold, based on the first light intensity profile data in the operational direction, and finds an operation absolute value of the scale plate from the position of the light relay portion.

2. The encoder according to claim 1, wherein the reference light propagation portions are formed on a third line along the operational direction.

* * * * *